(12) United States Patent
Leistra

(10) Patent No.: US 6,890,019 B2
(45) Date of Patent: May 10, 2005

(54) VEHICLE DOOR IMPACT BEAM ARRANGEMENT

(75) Inventor: Philip Walter Leistra, deceased, late of Waterford, MI (US); by Nancy J. Leistra, legal representative, Waterford, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/672,867

(22) Filed: Sep. 26, 2003

(65) Prior Publication Data

US 2005/0067856 A1    Mar. 31, 2005

(51) Int. Cl.[7] .............................. B60J 5/04; B60R 19/42
(52) U.S. Cl. .................................... 296/146.6; 293/128
(58) Field of Search .......................... 296/146.6, 146.5; 293/126, 128

(56) References Cited

U.S. PATENT DOCUMENTS

| | | | |
|---|---|---|---|
| 3,791,693 A | * | 2/1974 | Hellriegel et al. ........ 296/146.7 |
| 3,868,796 A | | 3/1975 | Bush |
| 3,907,358 A | * | 9/1975 | Barenyi et al. ........... 296/146.6 |
| 4,353,584 A | * | 10/1982 | Lovett ............................ 293/1 |
| 4,684,166 A | | 8/1987 | Kanodia |
| 4,880,674 A | * | 11/1989 | Shimizu ....................... 428/31 |
| 5,029,918 A | * | 7/1991 | Albright et al. ............. 293/126 |
| 5,924,760 A | | 7/1999 | Krajewski et al. |
| 6,328,359 B1 | * | 12/2001 | Pacella et al. .............. 293/128 |
| 6,343,832 B1 | * | 2/2002 | Queener et al. ............ 296/202 |
| 6,550,847 B2 | * | 4/2003 | Honda et al. ............. 296/146.6 |

* cited by examiner

Primary Examiner—D. Glenn Dayoan
Assistant Examiner—Greg Blankenship
(74) Attorney, Agent, or Firm—Kathryn A. Marra

(57) ABSTRACT

A vehicle door includes an inner panel, an outer panel operatively connected to the inner panel, and an impact beam. At least a portion of the impact beam is outboard of the outer panel to enable a thinner and more compact door compared to prior art doors. A rub strip is preferably attached to the impact beam to form a preformed part. The rub strip protects the door from damage resulting from minor impacts and conceals the impact beam from view.

7 Claims, 1 Drawing Sheet

VEHICLE DOOR IMPACT BEAM ARRANGEMENT

TECHNICAL FIELD

This invention relates to vehicle doors having an impact beam outboard of a door outer panel.

BACKGROUND OF THE INVENTION

Prior art vehicle doors have an inner panel and an outer panel operatively connected to one another to form a door cavity therebetween. Door hardware, such as a window, a latch, etc., is located within the door cavity. Prior art doors also typically include an impact beam, sometimes referred to as an "impact bar," an "intrusion beam," and the like, to transfer side impact loads to the door hinges and latch, and, correspondingly, a body hinge pillar and body lock pillar. Impact beams are located within the door cavity so that they are concealed from view. The door cavity is sufficiently thick to provide adequate clearance between the impact beam and door hardware, such as the window, particularly when the window is retracted into the door cavity.

Prior art vehicles also include rub strips, sometimes referred to as "body side moldings," to protect the outer surface of the door from damage resulting from minor impacts such as from shopping carts or the doors of an adjacent parked car. Rub strips are typically comprised of a resilient rubber or plastic material.

SUMMARY OF THE INVENTION

A vehicle door includes an inner panel and an outer panel operatively connected to one another such that they define a door cavity therebetween. The door also includes an impact beam sufficiently positioned such that at least a portion of the impact beam is outboard of the outer panel. The invention enables a thinner and more compact door compared to the prior art because the door cavity need not accommodate the impact beam and provide adequate clearance between the impact beam and door hardware. The invention may also enable the impact beam to contact a striking object earlier in a side impact event compared to the prior art because the impact beam may be further outboard compared to impact beams of prior art doors.

A rub strip preferably conceals at least a portion of the impact beam from view. The rub strip and the impact beam are preferably integrally attached to one another to form a preformed part that reduces part quantity and simplifies door assembly.

The above features and advantages, and other features and advantages of the present invention are readily apparent from the following detailed description of the best mode for carrying out the invention when taken in connection with the accompanying drawings.

DESCRIPTION OF THE PREFERRED EMBODIMENT

Figure 1:
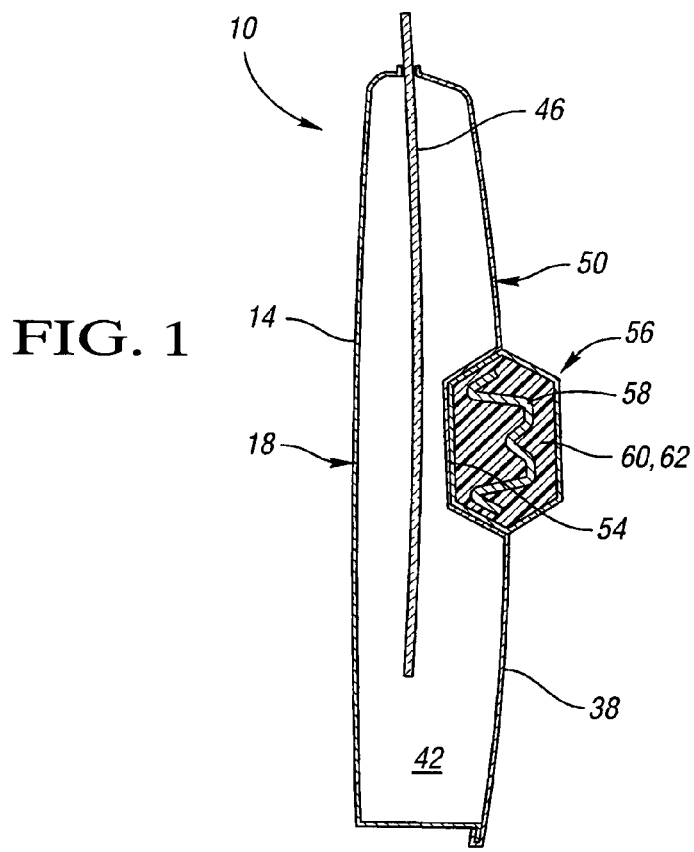
FIG. 1 is a schematic cross sectional view of a vehicle door taken along a vertical plane.
Figure 2:
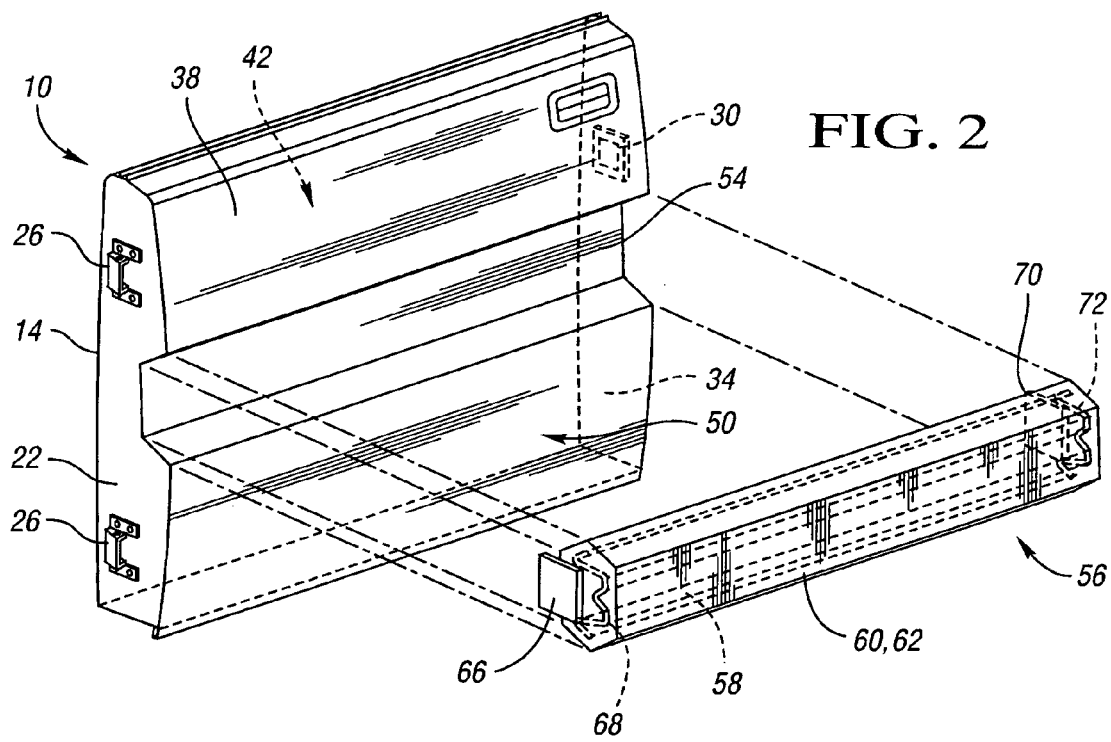
FIG. 2 is a schematic perspective exploded view of the vehicle door of FIG. 1.

Referring to FIGS. 1 and 2, a vehicle door 10 is schematically depicted. The vehicle door 10 includes an inner panel 14 that provides structural rigidity to the door. The inner panel 14 includes an inboard surface 18 on which interior trim (not shown) is mounted. The inner panel 14 also includes a forward wall 22 on which hinges 26 are mounted so that the door 10 is movable between an open and a closed position. A latch 30 is mounted on a rearward wall 34 of the inner panel 14 for engaging a striker (not shown) on a body lock pillar (not shown) to retain the door 10 in the closed position.

The door 10 includes an outer panel 38 operatively connected to the inner panel 14. Those skilled in the art will recognize a variety of methods of connecting the inner panel 14 and the outer panel 38 within the scope of the claimed invention, including hemming, adhesive bonding, etc. The inner panel 14 and the outer panel 38 define a door cavity 42 therebetween in which door hardware, such as a window 46, a window regulator (not shown), the latch 30, etc., is located. The window 46 is not depicted in FIG. 2.

The outer panel 38 is characterized by outboard surface 50 that at least partially defines the exterior surface of the door 10. The outboard surface 50 defines a concavity 54 that extends substantially from the forward wall 22 of the inner panel 14 to the rearward wall 34 of the inner panel. The concavity 54 positively locates, and partially retains, a side impact member 56 including an impact beam 58. Those skilled in the art will recognize a variety of impact beam configurations that may be employed within the scope of the claimed invention. For example, the impact beam may be a tubular bar, or a high-strength steel stamping with corrugations or a hat-shaped cross section. Exemplary impact beam configurations are described in U.S. Pat. No. 4,684,166, issued Aug. 4, 1987 to Kanodia, which is hereby incorporated by reference in its entirety.

The side impact member 56 also includes material 60 that conceals the impact beam 58 from view from the exterior of the door 10. The material 60 is preferably a resilient rubber or plastic that elastically absorbs or deflects small impacts thereby to function as a rub strip 62. In the embodiment depicted, the material 60 is integrally molded around at least a portion of the impact beam 58.

However, any material may be employed to conceal the impact beam 58 from view within the scope of the claimed invention, and the material may or may not be integrally attached to the impact beam 58. For example, body-side cladding made of sheet molded composite, fiberglass, etc., may be mounted to the outboard surface 50 of the outer panel 38 to conceal the impact beam 58.

The side impact member 56 includes a forward plate 66 operatively connecting the forward end 68 of the beam 58 to the forward wall 22 of the inner panel 14 to transfer side impact loads to the forward wall 22, the hinges 26, and, correspondingly, a vehicle body hinge pillar to which the hinges are operatively connected. The side impact member 56 also includes a rearward plate 70 operatively connecting the rearward end 72 of the beam 58 to the rearward wall 34 of the inner panel 14 to transfer side impact loads to the rearward wall 34 and the latch 30, and, correspondingly, to a body lock pillar. Those skilled in the art will recognize a variety of fastening techniques that may be employed to operatively connect the plates 66, 70 to the walls 22, 34 and the beam 58, such as welding, employing mechanical fasteners, etc. Alternatively, the impact beam may include flanges formed at each end that are connected to the forward and rearward walls.

The side impact member 56, except for the forward and rearward plates 66, 70, is located outboard of the outer panel 38. The material 60 surrounds the impact beam 58 and extends substantially from the forward plate 66 to the rearward plate 70, thereby concealing the impact beam 58 from view from the exterior of the door 10.

While the best mode for carrying out the invention has been described in detail, those familiar with the art to which this invention relates will recognize various alternative designs and embodiments for practicing the invention within the scope of the appended claims.

What is claimed is:

1. A vehicle door comprising:
an inner panel; an outer panel operatively connected to the inner panel such that the inner panel and the outer panel define a door cavity therebetween; and a side impact member including an impact beam and a rub strip comprised of a material that is molded around at least a portion of the impact beam; the side impact member being connected to at least one of the inner panel and the outer panel such that the portion of the impact beam is outboard of the outer panel and the material separates the portion of the impact beam and the outer panel.

2. The vehicle door of claim 1, wherein the outer panel is characterized by an outboard surface; and wherein the outboard surface defines a concavity in which at least a portion of the impact beam is located.

3. The vehicle door of claim 1, wherein at least a portion of the impact beam is concealed from view by the rub strip.

4. The vehicle door of claim 1, wherein the door is characterized by a first wall and a second wall; wherein the door further comprises a hinge operatively connected to the first wall and a latch operatively connected to the second wall; and wherein the impact beam includes a first flange extending from the forward end of the impact beam and a second flange extending from the rearward end of the impact beam, the first flange being connected to the first wall and the second flange being connected to the second wall to transfer side impact loads from the impact beam to the first wall and the second wall and, correspondingly, to to the hinge and the latch.

5. A side impact member for a vehicle door having an inner panel and an outer panel, the side impact member comprising an impact beam and a rub strip material formed around at least a portion of the impact beam; wherein the impact beam and rub strip material are matable to one of the inner panel and the outer panel such that the portion of the impact beam is outboard of the outer panel, the rub strip material separates the outer panel and the portion of the impact beam, and the rub strip material conceals the portion of the impact beam from view.

6. The side impact member of claim 5, wherein the vehicle door includes a first wall, a second wall, a hinge operatively connected to the first wall, and a latch operatively connected to the second wall; and wherein the side impact member further comprises a first plate at a first end of the impact beam operatively connectable to the first wall to transfer impact loads to the hinge, and a second plate at a second end of the impact beam operatively connectable to the second wall to transfer impact loads to the latch.

7. A vehicle door comprising:
an outer panel having an outboard surface defining a concavity;
an inner panel operatively connected to the outer panel such that the inner panel and the outer panel define a door cavity therebetween, the inner panel including a forward wall and a rearward wall;
an impact beam operatively connected to the forward wall and the rearward wall such that at least a portion of the impact beam is outboard of the outer panel and located within the concavity; and
a rub strip material operatively connected at least a portion of the impact beam such that at least a portion of the impact beam is concealed from view and the rub strip is between at least a portion of the impact beam and the outer panel.

\* \* \* \* \*